(12) United States Patent
Amidon et al.

(10) Patent No.: US 8,041,784 B1
(45) Date of Patent: Oct. 18, 2011

(54) REDUNDANT HYBRID P2P CONTENT SHARING

(75) Inventors: Christopher M. Amidon, Apex, NC (US); Alfredo C. Issa, Apex, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1351 days.

(21) Appl. No.: 11/475,635

(22) Filed: Jun. 27, 2006

(51) Int. Cl.
*G06F 15/16* (2006.01)
*G06F 15/177* (2006.01)
(52) U.S. Cl. .................. 709/220; 709/203
(58) Field of Classification Search .......... 709/203, 709/220
See application file for complete search history.

(56) References Cited

U.S. PATENT DOCUMENTS

| | | | |
|---|---|---|---|
| 6,065,062 A * | 5/2000 | Periasamy et al. | 709/242 |
| 6,351,792 B1 * | 2/2002 | Milillo | 711/162 |
| 6,687,732 B1 | 2/2004 | Bector et al. | |
| 6,920,637 B2 * | 7/2005 | Mason et al. | 719/318 |
| 7,370,015 B2 | 5/2008 | Gvily | |
| 7,401,115 B1 | 7/2008 | Arsenault | |
| 2001/0007099 A1 | 7/2001 | Rau et al. | |
| 2002/0112001 A1 | 8/2002 | Sutherland et al. | |
| 2002/0184310 A1 * | 12/2002 | Traversat et al. | 709/204 |
| 2002/0188657 A1 * | 12/2002 | Traversat et al. | 709/201 |
| 2003/0093520 A1 | 5/2003 | Beesley | |
| 2003/0177246 A1 * | 9/2003 | Goodman et al. | 709/228 |
| 2004/0044723 A1 | 3/2004 | Bell et al. | |
| 2004/0070678 A1 | 4/2004 | Toyama et al. | |
| 2004/0148434 A1 * | 7/2004 | Matsubara et al. | 709/246 |
| 2004/0236983 A1 * | 11/2004 | Burton et al. | 714/6 |
| 2005/0188085 A1 * | 8/2005 | Lin et al. | 709/225 |
| 2005/0190273 A1 | 9/2005 | Toyama et al. | |
| 2005/0229243 A1 | 10/2005 | Svendsen et al. | |
| 2006/0047839 A1 | 3/2006 | Tate et al. | |
| 2006/0077955 A1 * | 4/2006 | Poustchi et al. | 370/352 |
| 2006/0136551 A1 * | 6/2006 | Amidon et al. | 709/203 |
| 2007/0073837 A1 * | 3/2007 | Johnson-McCormick et al. | 709/217 |
| 2007/0198636 A1 * | 8/2007 | Inamoto et al. | 709/203 |

FOREIGN PATENT DOCUMENTS
WO WO 2006/055535 * 5/2006

OTHER PUBLICATIONS

Pix Village, http://www.pixvillage.com/online-photo-sharing-features-p2p.aspx.

* cited by examiner

*Primary Examiner* — Larry Donaghue
(74) *Attorney, Agent, or Firm* — Withrow & Terranova, PLLC

(57) ABSTRACT

A redundant hybrid peer-to-peer content sharing system is provided. In general, the system includes a proxy hosted by a central server and, for each user, a primary user device hosting a primary sharing engine and one or more secondary user devices hosting secondary sharing engines. The user's shared images are hosted by the primary user device, and, based on the capabilities of the secondary user devices, versions of the shared images are copied to the secondary devices. When a guest at a guest node desires to view a shared image, a request for the shared image is provided to the proxy. Generally, if the primary user device is online, the proxy forwards the request to the primary device. If the primary user device is offline, the proxy identifies one of the secondary user devices capable of serving the request and forwards the request to the identified secondary user device.

17 Claims, 7 Drawing Sheets

REDUNDANT HYBRID P2P CONTENT SHARING

FIELD OF THE INVENTION

The present invention relates to a hybrid peer-to-peer (P2P) content sharing system.

BACKGROUND OF THE INVENTION

With the proliferation of digital cameras, numerous online photosharing services have emerged and are becoming widely accepted by photo enthusiasts. The photosharing services are generally based on one of two architectures. The first is a centrally hosted serving architecture where a central server hosts digital images for a number of users and provides photosharing services to guests. The second is a peer-to-peer (P2P) architecture where a user creates and stores photo albums on the user's computer. The user's computer then provides photosharing services to guests in a P2P fashion.

For various reasons, some P2P systems now employ a hybrid P2P architecture where a proxy server operates as a single point of entry for all of the peer nodes in the P2P system. Thus, when a guest node requests a digital image from a peer node, the request is first provided to the proxy server, which in turn provides the request to the peer node. In a similar fashion, the response from the peer node is typically routed through the proxy server.

One issue with both the P2P architecture and the hybrid P2P architecture is that a user's shared images are only available when the user's peer device is online. In an attempt to alleviate this problem, some hybrid P2P architectures incorporate a caching proxy server that operates to cache recently requested images. As a result, subsequent requests for an image stored in the cache may be served directly from the caching proxy server. As such, the cached images are available even if the corresponding peer node hosting the images is offline. However, caching proxy servers only cache previously requested images and, due to their limited storage space, only cache a small subset of all images shared by the peer nodes in the system. Thus, the issue of availability of shared images when the hosting peer is offline still remains.

Therefore, there is a need for an improved P2P content sharing architecture that substantially eliminates the issue of availability of shared content when the hosting peer is offline.

SUMMARY OF THE INVENTION

The present invention provides a redundant hybrid peer-to-peer content sharing system. In general, the system includes a proxy hosted by a central server and, for each user, a primary user device hosting a primary sharing engine and one or more secondary user devices hosting secondary sharing engines. The user's shared images are hosted by the primary user device, and, based on the capabilities of the secondary user devices, versions of the shared images are copied to the secondary devices. When a guest at a guest node desires to view a shared image, a request for the shared image is provided to the proxy. Generally, if the primary user device is online, the proxy forwards the request to the primary device. If the primary user device is offline, the proxy identifies one of the secondary user devices capable of serving the request and forwards the request to the identified secondary user device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1:
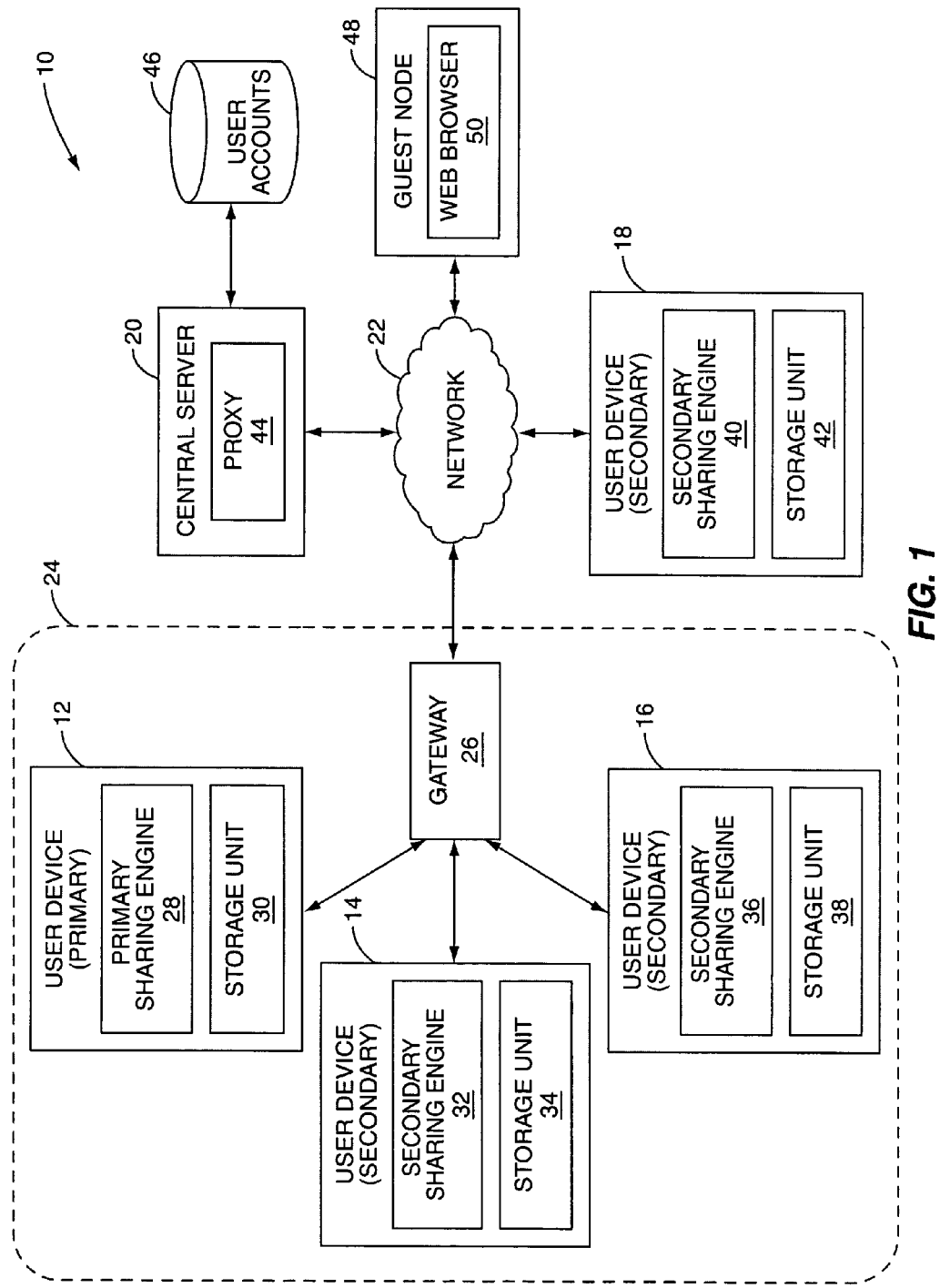
FIG. 1 illustrates a hybrid peer-to-peer (P2P) content sharing system according to one embodiment of the present invention.
Figure 3A:
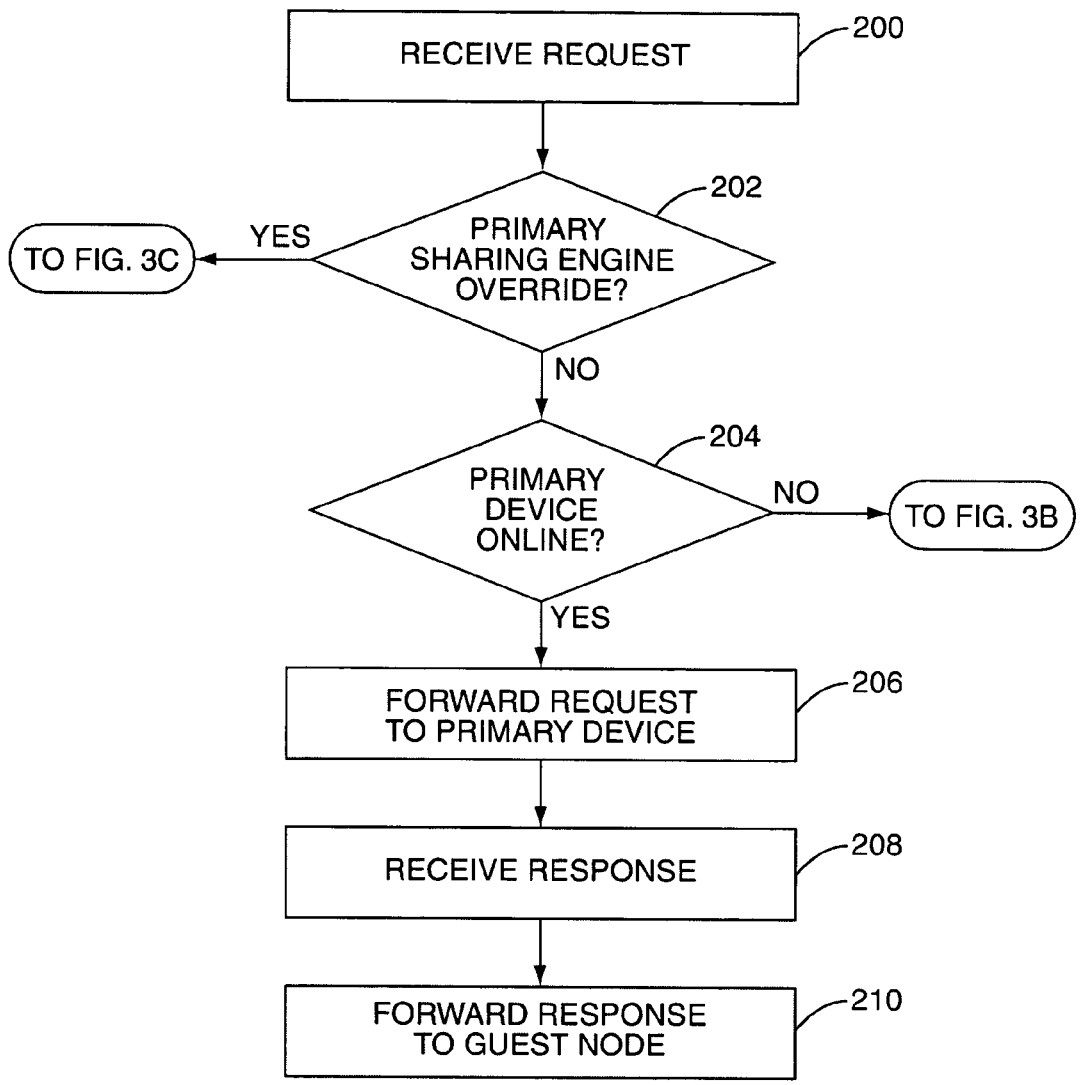
Figure 3B:
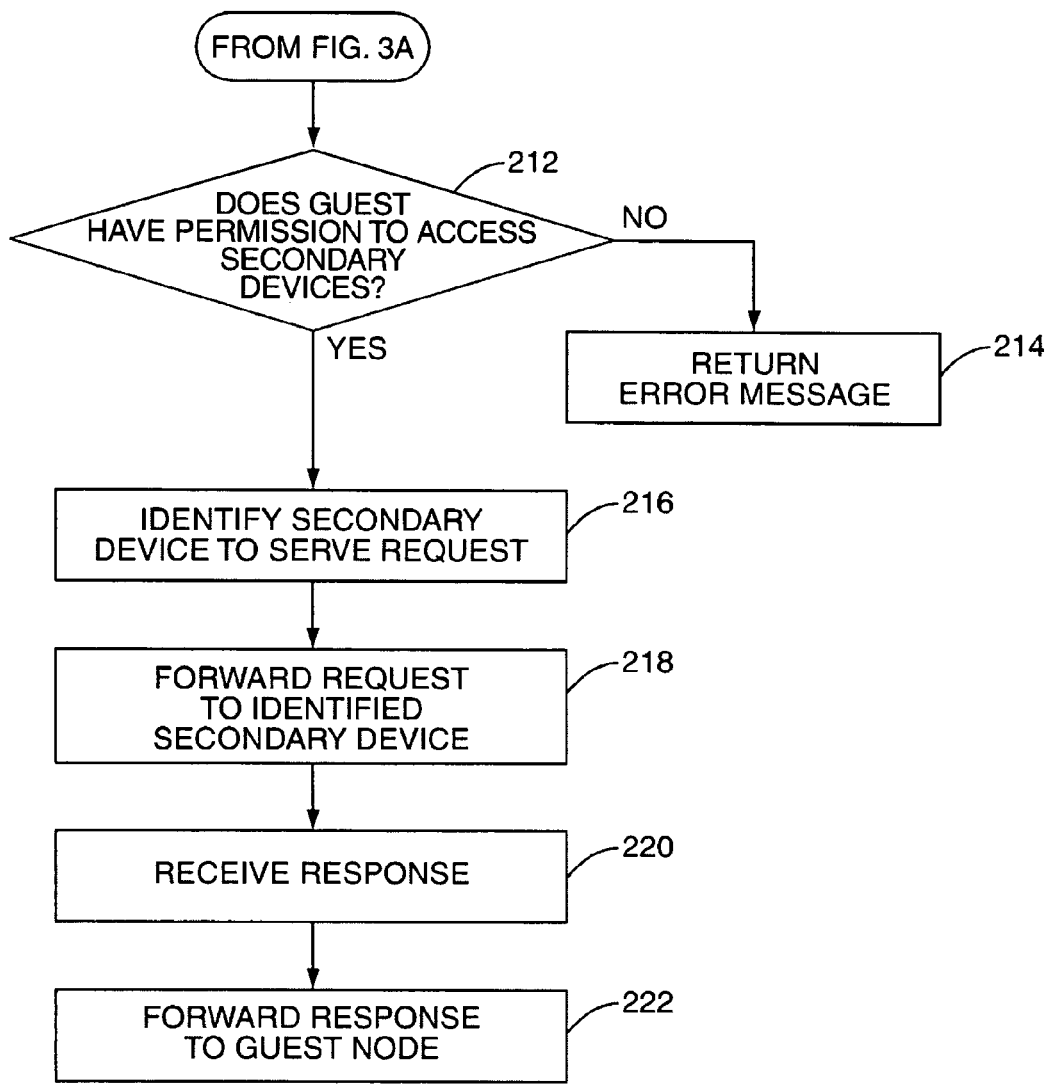
Figure 3C:
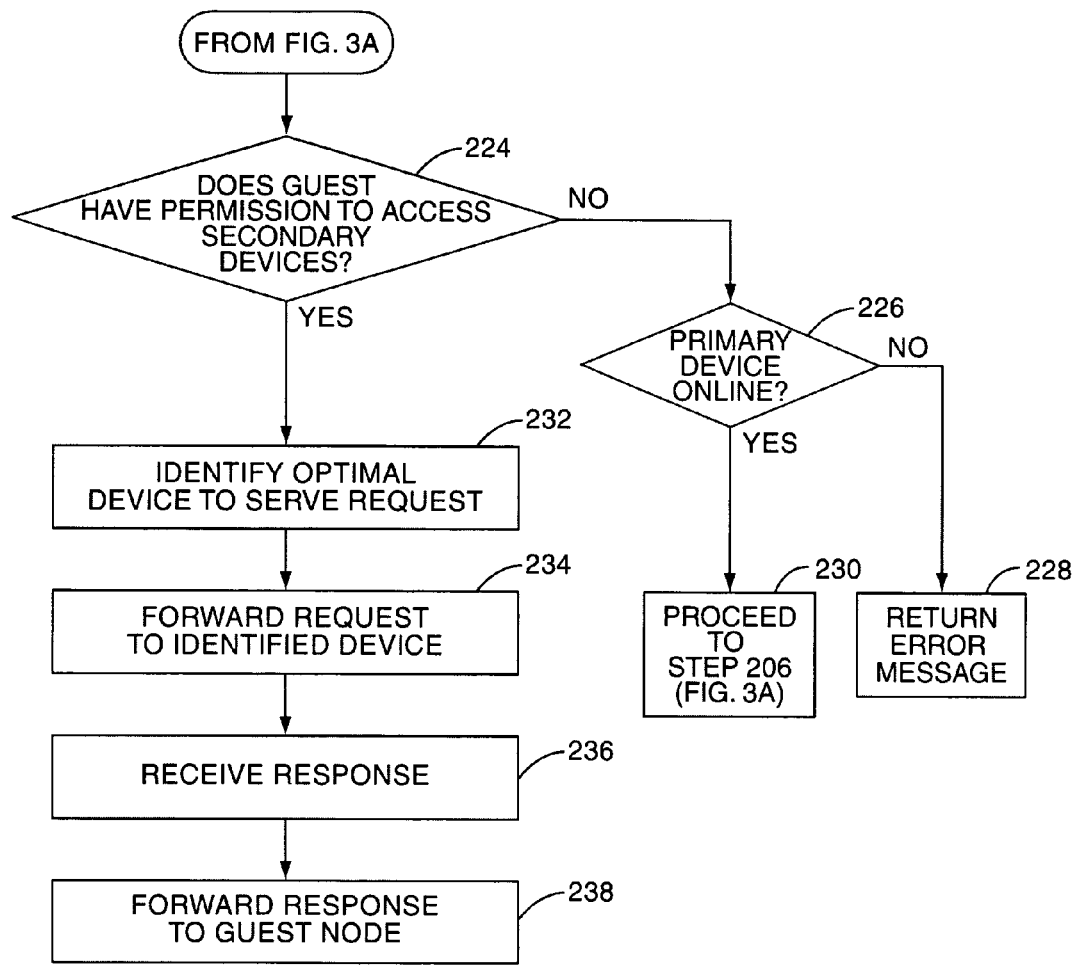
Figure 4:
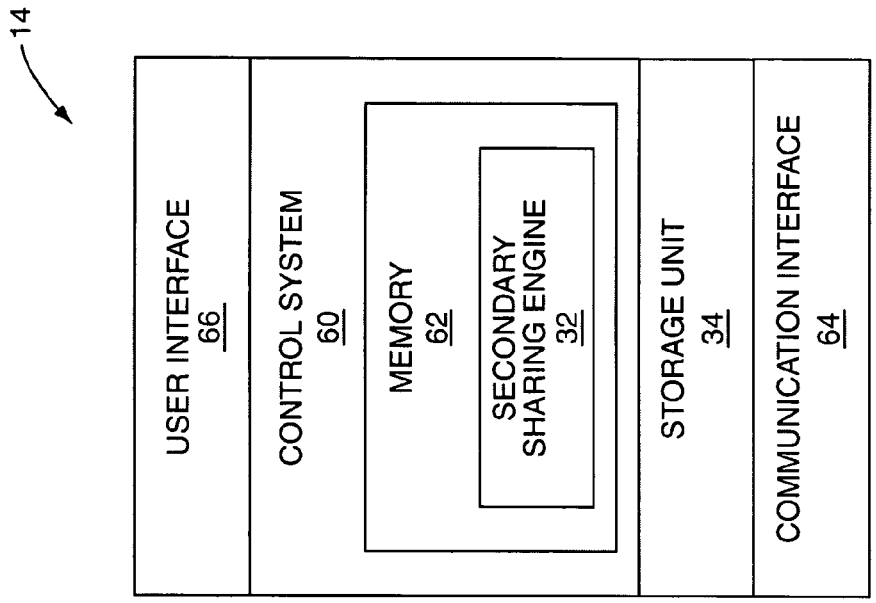
Figure 5:
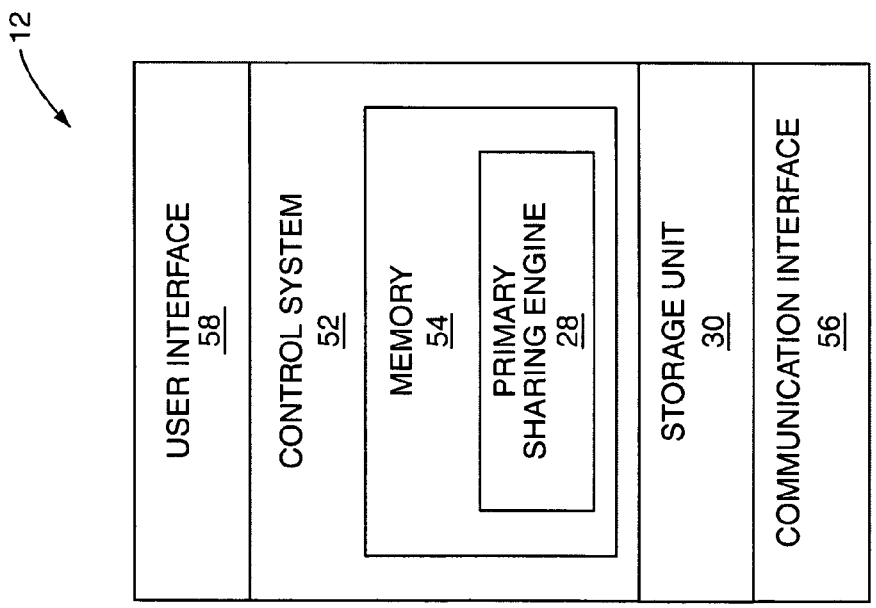
Figure 6:
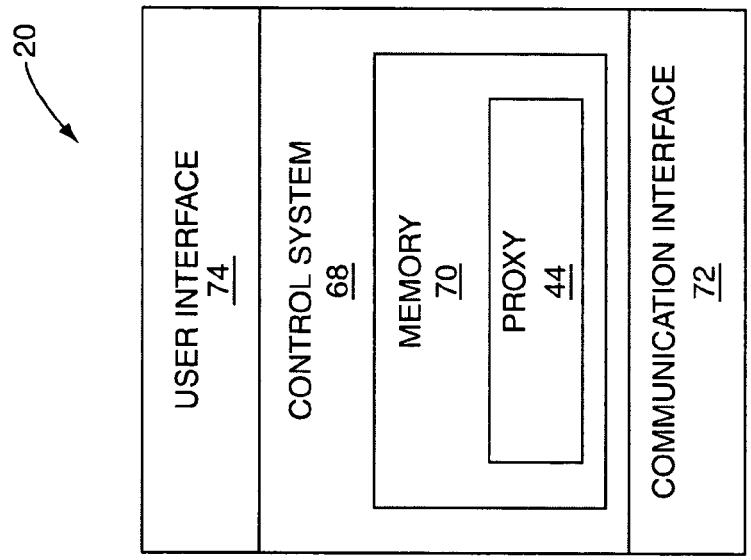

FIGS. 3A-3C comprise a flow chart illustrating the operation of the proxy of FIG. 1 according to one embodiment of the present invention;

FIG. 4 is a block diagram of the primary user device of FIG. 1 according to one embodiment of the present invention;

FIG. 5 is a block diagram of one of the secondary user devices of FIG. 1 according to one embodiment of the present invention; and FIG. 6 is an exemplary block diagram of the central server of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a hybrid peer-to-peer (P2P) image sharing system 10 according to one embodiment of the present invention. While the discussion herein focuses on digital invention, the present invention is equally applicable to any type of digital content. The system 10 includes a number of user devices 12-18 associated with a particular user desiring to share images. Although not illustrated, the system 10 may additionally include user devices associated with any number of additional users. Each of the user devices 12-18 may be, for example, a personal computer, a laptop computer, a Personal Digital Assistant (PDA), a mobile telephone, a Digital Video Recorder (DVR) such as a TiVo DVR, or the like. The user devices 12-18 are connected to a central server 20 via a network 22, which is preferably a public distributed network such as, but not limited to, the Internet. In this example, the user devices 12-16 are part of a Local Area Network (LAN) 24 and are connected to the network 22 by a gateway 26. Note that while the user devices 12-16 are shown as being part of the LAN 24, the present invention is not limited thereto.

The user device 12, which is hereafter referred to as the primary user device 12, includes a primary sharing engine 28 and a storage unit 30. The primary sharing engine 28 is preferably implemented in software. However, the present invention is not limited thereto. The primary sharing engine 28 operates to share images stored in the storage unit 30. The storage unit 30 may be any digital storage component or device such as, for example, a hard-disc drive, memory, or the like.

The user device 14, which is hereafter referred to as the secondary user device 14, includes a secondary sharing engine 32 and a storage unit 34. The secondary sharing engine 32 is preferably implemented in software. However, the present invention is not limited thereto. As discussed below in detail, in operation, at least one version of each of the images shared by the primary sharing engine 28 is copied to the secondary user device 14 and stored in the storage unit 34. In general, the secondary sharing engine 32 operates as a redundant sharing engine for sharing the shared images when the primary user device 12 is offline. In addition, for some types of devices, it may be desirable to further include a light-weight application that activates the secondary sharing engine 32 upon receiving a request from the central server 20. In a similar fashion, the user device 16, which is hereafter referred to as the secondary user device 16, includes a secondary sharing engine 36 and a storage unit 38.

The user device 18 may be, for example, a personal computer associated with the user such as, but not limited to, the user's office computer, the user's PDA or mobile telephone having access to the network 22, or the like. The user device 18, which is hereafter referred to as the secondary user device 18, includes a secondary sharing engine 40 and a storage unit 42. The secondary sharing engine 40 is preferably implemented in software. However, the present invention is not limited thereto. As discussed below in detail, in operation, at least one version of each of the images shared by the primary sharing engine 28 is copied to the secondary user device 18 and stored in the storage unit 42. In general, the secondary sharing engine 40 operates as a redundant sharing engine for sharing the shared images when the primary user device 12 is offline. In addition, for some types of devices, it may be desirable to further include a light-weight application that activates the secondary sharing engine 40 upon receiving a request from the central server 20.

The central server 20 includes a proxy 44 and has access to user accounts database 46. While the central server 20 is illustrated as a single server, it may alternatively be implemented as a number of distributed servers. The proxy 44 may be implemented in hardware, software, or a combination of hardware and software. In general, when the primary user device 12 is online, the proxy 44 operates to route requests for shared images hosted by the primary user device 12 to the primary user device 12. However, when the primary user device 12 is offline, the proxy 44 operates to identify one of the secondary user devices 14-18 for serving the request and routes the request to the identified one of the secondary user devices 14-18.

Optionally, the proxy 44 may provide a caching service, where images previously requested may be cached at the central server 20. Thereafter, requests for the cached images may be served by the central server 20. The proxy 44 may implement a caching algorithm that takes into account the versions, or types, of images hosted by the secondary user devices 14-18. For example, if none of the secondary user devices 14-18 host high-quality versions of the shared images, then the caching algorithm may give priority to high-quality versions of the shared images. As a result, even when the primary user device 12 is offline, the requesting node may obtain a high-quality version of a desired image if the image is cached at the central server 20. If the image is not cached at the central server 20, the proxy 44 then routes the request to one of the secondary user devices 14-18.

The user accounts database 46 generally includes account information for a number of users, such as the user of the user devices 12-18, registered with the system 10 for sharing images. As an example, for the user of the user devices 12-18, the user's account information includes information identifying the user devices 12-18 and associating the user devices 12-18 with the user, information identifying which of the user devices 12-18 is the primary user device hosting the primary sharing engine and which of the user devices 12-18 are the secondary user devices hosting secondary sharing engines. In addition, for each of the secondary user devices 14-18, the user's account information includes information identifying the types, or versions, of the images shared and stored by the primary user device 12 that are stored on each of the secondary user devices 14-18. For example, for each image shared by the primary user device 12, the secondary devices 14-18 may store one or more of a full size version; a high, medium, and low quality screen size version; and a high, medium, and low quality thumbnail version of the image. As discussed below in more detail, the types of images hosted by each of the secondary user devices 14-18 may be configured based on the capabilities of the secondary user devices 14-18 and, optionally, the number of images shared by the primary user device 12.

The system 10 also includes a guest node 48, which may be a personal computer, laptop computer, a PDA, a mobile phone, or the like having access to the network 22. The guest node 48 may or may not be a peer node in the P2P network. In this example, the guest node 48 requests shared images using a web browser 50. However, the present invention is not limited thereto. The guest node 48 may alternatively request shared images using, for example, a proprietary application associated with the system 10.

Figure 2:
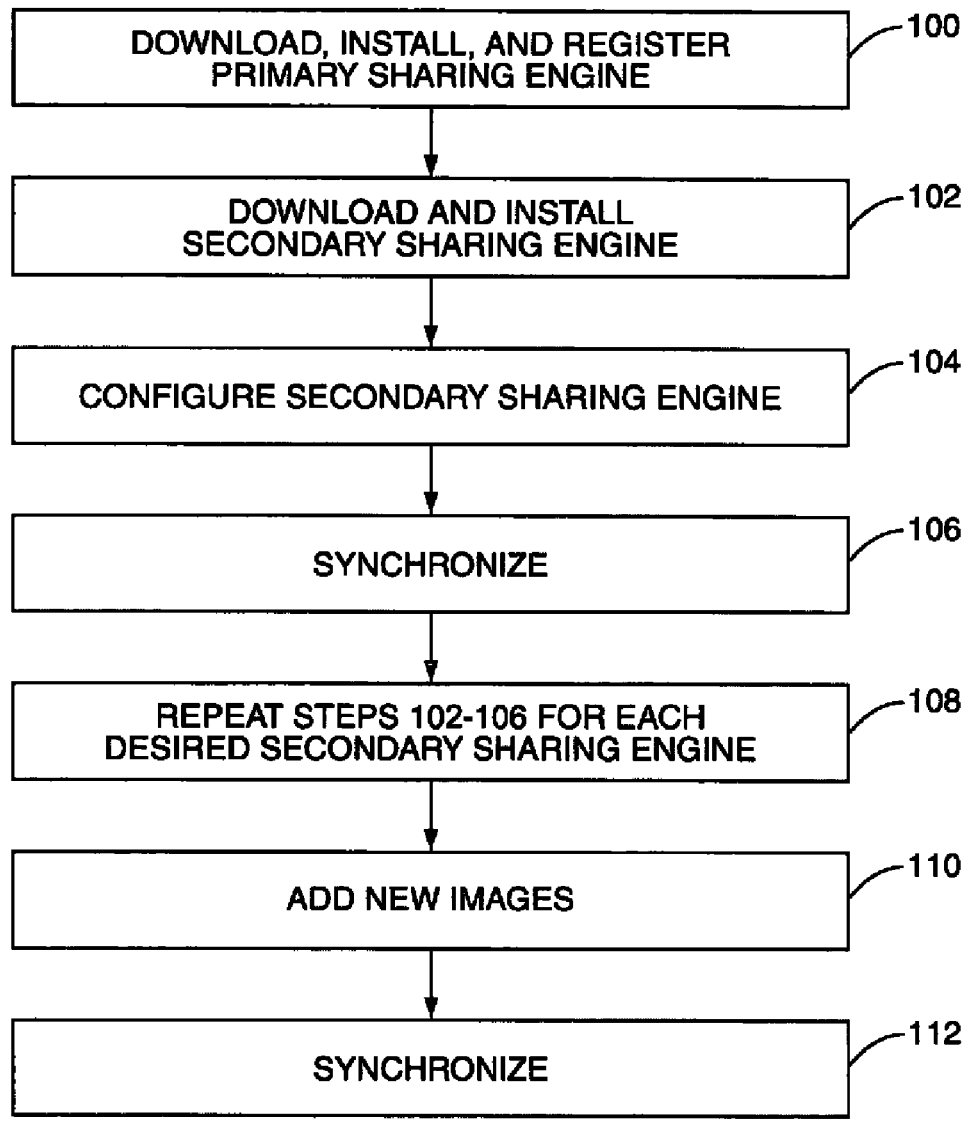
FIG. 2 is a flow chart illustrating an installation, configuration, and synchronization process for the primary and secondary sharing engines of FIG. 1 according to one embodiment of the present invention.

FIG. 2 is a flow chart illustrating an installation, registration, and synchronization process for the primary and secondary sharing engines 28, 32, 36, and 40. First, the primary sharing engine 28 is downloaded and installed on the primary user device 12, and the user of the primary user device 12 registers with the central server 20 (step 100). Registration may include providing information such as, but not limited to, the user's name, mailing address, e-mail address, and demographic information. Thereafter, in this example, the secondary sharing engine 32 is downloaded and installed on the secondary user device 14 (step 102). Before, during, or after download and installation, the secondary user device 14 and the secondary sharing engine 32 are associated with the user of the primary user device 12 and therefore associated with the primary user device 12 and the primary sharing engine 28. Alternatively, the primary sharing engine 28 may self-propagate to automatically install the secondary sharing engine 32 on the secondary user device 14.

The secondary sharing engine 32 is then configured to determine the versions of the images shared by the primary user device 12 to be copied to the secondary user device 14 (step 104). The secondary sharing engine 32 may be configured automatically based on detected capabilities of the secondary user device 14 or manually configured by the user. If automatically configured, the detected capabilities may be, for example, total or available storage space in the storage unit 34, the type and speed of the network connection the secondary user device 14 has to the network 22, processor speed of the secondary user device 14, and the like. In addition to the capabilities of the secondary user device 14, the secondary sharing engine 32 may be automatically configured based on the number of images shared by the primary user device 12, which may be obtained from the central server 20. As an example, if the secondary user device 14 is a PDA having limited storage space, the secondary sharing engine 32 may be configured to obtain high quality thumbnails of the shared images from the primary user device 12. In contrast, if the secondary user device 14 is a DVR or personal computer having a large amount of storage space, the secondary sharing engine 32 may be configured to obtain the full size version of each of the images shared by the primary user device 12. In addition, the secondary sharing engine 32 may obtain or generate high, medium, and low quality screen size versions and high, medium, and low quality thumbnails of each of the images shared by the primary user device 12. Once configured, the configurations of the secondary sharing engine 32 are provided to the central server 20 and stored as part of the user's account information.

In the preferred embodiment, the secondary user devices 14-18 host at least one version of each of the images shared by the primary user device 12. However, the present invention is not limited thereto. In addition to the configurations described above, the secondary user devices 14-18 may also be configured to host only a subset of the shared images. For example, the secondary user device 14 may be configured to host only the high quality screen size version of each of the most recent images shared by the primary user device 12, which may be the images shared by the primary user device 12 added or captured within the last month. As another example, the secondary user device 14 may be configured to host only those images tagged with one or more desired keywords such as, for example, "Christmas," "Birthday," "Sporting Event," "Friends," "Family," or the like.

Next, the primary sharing engine 28 synchronizes with the secondary sharing engine 32 (step 106). More specifically, the central server 20 notifies the primary sharing engine 28 of the secondary sharing engine 32 and the configurations of the secondary sharing engine 32. Based on the configurations, the primary sharing engine 28 obtains the desired versions of each of the shared images and provides these versions of the shared images to the secondary user device 14. If the primary user device 12 does not have the desired versions of the shared images stored in the storage unit 30, the primary sharing engine 28 may generate the desired versions. For example, if the medium quality screen size images are to be provided to the secondary user device 14, the primary sharing engine 28 may generate the medium quality screen size versions of the shared images from, for example, the full size version of the shared images. If more than one version of each of the shared images are to be hosted by the secondary user device 14, the primary sharing engine 28 may provide all desired versions or only the highest quality one of the desired versions to the secondary user device 14. For example, if both high and low quality screen size images are to be provided to the secondary user device 14, the primary sharing engine 28 may provide only the high quality screen size versions of the shared images to the secondary user device 14. Thereafter, the secondary user device 14 may generate and store the low quality screen size versions of the shared images or generate the low quality screen size versions of the shared images as needed.

The primary sharing engine 28 typically provides the desired versions of the shared images to the secondary user device 14 via the network 22 and the proxy 44. In another embodiment, the proxy 44 may enable proxy bypassing where the proxy 44 facilitates a connection between two peer devices but is bypassed for the transfer of large files, such as images. For more details, the interested reader is directed to commonly owned and assigned U.S. patent application Ser. No. 11/234,493, entitled SYSTEM AND METHOD FOR LOWERING PROXY BANDWIDTH UTILIZATION, which was filed Sep. 23, 2005 and is hereby incorporated herein by reference in its entirety. Alternatively, the desired versions of the shared images may be transferred to the secondary user device 14 via a direct peer-to-peer connection over the network 22.

However, in this embodiment, the primary and secondary user devices 12 and 14 are within the LAN 24. As such, rather than transferring the desired versions of the shared images over the network 22, the primary sharing engine 28 may detect that the secondary user device 14 is within the LAN 24 and provide the desired versions of the shared images to the secondary user device 14 via the gateway 26 or a direct point-to-point link via, for example, an IEEE 802.11 wireless communication link.

In addition to providing the desired versions of the shared images to the secondary user device 14, the primary user device 12 may additionally synchronize metadata, such as ID3 tags, for the shared images, configuration files, permissions, and the like during the synchronization process. Regarding permissions and configuration files, by including them in the synchronization process, the primary user device 12 ensures that the same permission and restrictions will be imposed on guests whether the images are served by the primary user device 12 or the secondary user device 14.

At this point, steps 102-106 may be repeated for each additional secondary user device, such as the secondary user devices 16-18 (step 108). When new images to be shared are added, the primary sharing engine 28 synchronizes with each of the secondary sharing engines 32, 36, and 40 such that the desired versions of the added images are copied to the secondary devices 14-18 (steps 110 and 112). In addition, the synchronization may optionally transfer metadata for the added images, permissions, configuration files, and the like to the secondary devices 14-18. The new images may be added at the primary user device 12. In addition, the system 10 may enable images to be added at the secondary user devices 14-18. For example, if images are added to the secondary user device 14, the secondary sharing engine 32 may retain versions of the added images desired by the secondary user device 14 and provide the added images to the primary user device 12. The primary sharing engine 28 may then synchronize with the other secondary sharing engines 36 and 40.

It should be noted that the user may change which user device 12-18 is the primary user device. For example, the user may re-configure the user devices 12-18 such that the sharing engine 32 of the user device 14 is the primary sharing engine. As a result, the user devices 12-18 will communicate to redistribute the shared images accordingly.

FIGS. 3A-3C illustrate the operation of the proxy 44 to serve requests from guest nodes such as the guest node 48 according to one embodiment of the present invention. First, the proxy 44 receives a request for a shared image from the guest node 48 (step 200). In this example, the request is for an image shared by the user associated with the user devices 12-18. The guest at the guest node 48 may be invited by, for example, an e-mail containing a corresponding web link to the shared image, or the guest at the guest node 48 may be an uninvited guest where, for example, the central server 20 enables uninvited guests to search for shared images.

Before proceeding, if the proxy 44 provides a caching service, the proxy 44 may determine whether the requested image is cached by the central server 20. If so, the proxy 44 may serve the request. If not, the proxy 44 may then optionally determine whether there has been a primary sharing engine override (step 202). A primary sharing engine override is when the proxy 44 automatically determines or when the user instructs the proxy 44 to treat the user devices 12-18 equally. As discussed below, when there has been a primary sharing engine override, the proxy 44 selects the most optimal one of the user devices 12-18 for serving the request.

If there has been no primary sharing engine override, the proxy then determines whether the primary user device 12 is online (step 204). If so, the proxy 44 forwards the request to the primary user device 12 via the network 22 (step 206). The primary user device 12 then sends a response including the requested image to the proxy 44, and the proxy 44 receives the response (step 208). The proxy 44 then forwards the response to the guest node 48 (step 210).

Returning to step 204, if the primary user device 12 is not online, the process proceeds to FIG. 3B. As illustrated, the proxy 44 may then determine whether the guest node 48 has permission to access the secondary user devices 14-18 (step 212). Step 212 is optional. The proxy 44 may determine whether the guest node 48 has permission to access the secondary user devices 14-18 based on, for example, a list of specific users or guests that are permitted to access the secondary user devices 14-18; by determining whether the guest at the guest node 48 was invited to view the shared image where only invited guests are permitted to access the secondary user devices 14-18; by determining whether the guest at the guest node 48 is a premium level user of the system 10 where premium level users may pay for premium services provided by the central server 20 and have permission to access the secondary user devices 14-18; and the like.

If the guest node 48 is not permitted to access the secondary user devices 14-18, the proxy 44 returns an error message to the guest node 48 (step 214). If the guest node 48 is permitted to access the secondary user devices 14-18, the proxy 44 then identifies one of the secondary user devices 14-18 for serving the request (step 216). More specifically, the proxy 44 first identifies which of the secondary user devices 14-18 are capable of serving the request. If the request is a general request for the shared image and not a request for a specific version of the shared image, the proxy 44 may identify the highest quality version of the requested image hosted by the secondary user devices 14-18. In contrast, if the request is for a particular version of the shared image or if the proxy 44 detects the capabilities of the guest node 48 and selects a particular version to be provided based on the capabilities of the guest node 48, the proxy 44 may determine which of the secondary user devices 14-18 host either the needed version of the requested image or some higher quality version of the requested image.

As an example, the request may be a general request for the shared image, and the highest quality version hosted by any of the secondary user devices 14-18 may be the high quality screen size version. If only one of the secondary user devices 14-18 host this version of the requested image, then that secondary user device is identified as the one for serving the request. However, if more than one of the secondary user devices 14-18 hosts the identified version of the requested image, then the proxy 44 identifies the optimal one of these secondary user devices to serve the request. Assuming that the secondary user devices 14 and 18 host the high quality screen size version of the requested image, the proxy 44 then selects the optimal one of the secondary user devices 14 and 18 for serving the request. The optimal secondary user device may be selected based on, for example, average historical throughput of the secondary user devices 14 and 18, the historical availability of the secondary user devices 14 and 18, the current availability of the secondary user devices 14 and 18, the historical reliability of the secondary user devices 14 and 18, historical load conditions at the secondary user devices 14 and 18, an expected or projected load condition at the secondary user devices 14 and 18, or the like. In order for the proxy 44 to determine historical and projected load conditions, the secondary user devices 14-18 may provide status information such as, but not limited to, current load conditions, historical load conditions, and projected load conditions to the proxy 44 either periodically or upon request by the proxy 44. The projected load conditions may particularly be beneficial for DVRs having scheduled recordings.

In addition or alternatively, the proxy 44 may consider the network topology when identifying the one of the secondary devices 14-18 for serving the request. For example, if the guest node 48 is part of the LAN 24, the secondary user devices 14-16 may be given priority over the secondary user device 18 that is not within the LAN 24. Thus, if the guest node 48 requests a high quality version of a shared image, the secondary user devices 14-16 may be preferred over the secondary user device 18 even if the secondary user device 18 hosts the high quality version of the image and the secondary user devices 14-16 do not.

Assuming that the secondary user device 14 is identified as the user device for serving the request, the proxy 44 then sends a request for the requested image to the secondary user device 14 (step 218). The request may be for a desired version of the image or a general request for the image. The secondary user device 14 then sends a response including the requested image to the proxy 44 (step 220), which in turn forwards the response to the guest node 48 (step 222).

Returning to FIG. 3A and step 202, if there has been a primary sharing engine override, the process proceeds to FIG. 3C. As illustrated, the proxy 44 may optionally then determine whether the guest node 48 has permission to access the secondary user devices 14-18, as discussed above (step 224). If the guest node 48 does not have permission to access the secondary user devices 14-18, the proxy 44 then determines whether the primary user device 12 is online (step 226). If not, the proxy 44 returns an error message to the guest node 48 (step 228). If the primary user device is online, the process proceeds to step 206 (FIG. 3A) where the request is forwarded to the primary user device 12 (step 230).

Returning to step 224, if the guest node 48 has permission to access the secondary user devices 14-18, the proxy 44 then identifies the optimal one of the primary and secondary user devices 12-18 for serving the request in the same manner as described above for selecting the optimal secondary user device with respect to step 216 (step 232). Assuming that the secondary user device 14 is identified as the optimal user device for serving the request, the proxy 44 then forwards the request to the secondary user device 14 (step 234). The secondary user device 14 then sends a response including the requested image to the proxy 44 (step 236), which in turn forwards the response to the guest node 48 (step 238).

FIG. 4 is a block diagram of an exemplary embodiment of the primary user device 12. In general, the primary user device 12 includes a control system 52 having associated memory 54. In this example, the primary sharing engine 28 is implemented, at least in part, in software and stored in the memory 54. The primary user device 12 also includes the storage unit 30. While the storage unit 30 is illustrated as being separate from the memory 54, the storage unit 30 may alternatively be incorporated into the memory 54. The primary user device 12 also includes a communication interface 56 communicatively coupling the primary user device 12 to the network 22 (FIG. 1). The communication interface 56 may be, for example, an Ethernet interface or a local wireless interface, such as but not limited to an IEEE 802.11 wireless interface, communicatively coupling the primary user device 12 to the network 22 via the gateway 26. As another example, the communication interface 56 may be a cellular wireless interface communicatively coupling the primary user device 12 to the network 22 via a cellular network. The primary user device 12 also includes a user interface 58, which may include components such as, but not limited to, a display, a keyboard or other input device, speakers, and the like.

FIG. 5 is a block diagram of an exemplary embodiment of the secondary user device 14. However, the following discussion is equally applicable to the other secondary user devices 16-18. In general, the secondary user device 14 includes a control system 60 having associated memory 62. In this example, the secondary sharing engine 32 is implemented, at least in part, in software and stored in the memory 62. The secondary user device 14 also includes the storage unit 34. While the storage unit 34 is illustrated as being separate from the memory 62, the storage unit 34 may alternatively be incorporated into the memory 62. The secondary user device 14 also includes a communication interface 64 communicatively coupling the secondary user device 14 to the network 22 (FIG. 1). The communication interface 64 may be, for example, an Ethernet interface or a local wireless interface, such as but not limited to an IEEE 802.11 wireless interface, communicatively coupling the secondary user device 14 to the network 22 via the gateway 26. As another example, the communication interface 64 may be a cellular wireless interface communicatively coupling the secondary user device 14 to the network 22 via a cellular network. The secondary user device 14 also includes a user interface 66, which may include components such as, but not limited to, a display, a keyboard or other input device, speakers, and the like.

FIG. 6 is a block diagram of an exemplary embodiment of the central server 20. In general, the central server 20 includes a control system 68 having associated memory 70. In this example, the proxy 44 is implemented, at least in part, in software and stored in the memory 70. The central server 20 also includes a communication interface 72 communicatively coupling the central server 20 to the network 22 (FIG. 1). The central server 20 may also include a user interface 74, which may include components such as, but not limited to, a display, a keyboard or other input device, speakers, and the like.

The present invention provides substantial opportunity for variation without departing from the spirit or scope of the present invention. More specifically, while the discussion here focuses on digital images, the present invention is equally applicable to any type of digital content. As an example, the present invention may be used to share digital videos wherein high-quality versions of the videos may be hosted by the primary user device 12 and high-quality versions and/or lower-quality versions of the videos may be hosted by the secondary user devices 14-18. As another example, while the primary sharing engine 28 and, for example, the secondary sharing engine 32 are discussed herein as being on separate user devices 12 and 14, the primary user device 12 may include both primary and secondary sharing engines.

Those skilled in the art will recognize improvements and modifications to the preferred embodiments of the present invention. All such improvements and modifications are considered within the scope of the concepts disclosed herein and the claims that follow.

What is claimed is:

1. A central server (Appendix B, FIG. 1) for a hybrid peer-to-peer (P2P) content sharing system including, for a particular user, a primary user device (Appendix B, FIG. 1, device A) comprising a primary sharing engine for sharing content stored on the primary user device and at least one secondary user device (Appendix B, FIG. 1, devices B, C, and D) comprising a secondary sharing engine for obtaining and sharing at least one version of the content shared by the primary user device (Appendix B, page 5, lines 2-5), comprising:
    a) a communication interface communicatively coupling the central server to a network (Appendix B, FIG. 1); and
    b) a control system (Appendix B, FIG. 1, page 6, lines 12-16) associated with the communication interface and adapted to:
        i) receive a request for content shared by the user from a guest node via the network (Appendix B, page 3, lines 1-13, page 5, lines 16-17, and FIG. 1);
        ii) identify one of the primary user device associated with the particular user and the at least one secondary user device associated with the particular user as a user device for serving the request (Appendix B, Table A, page 5, lines 13-30), wherein the at least one secondary user device is automatically configured based on known capabilities of the at least one secondary user device (Appendix B, page 4, lines 9-12); and
        iii) route the request to the user device for serving the request via the network (Appendix B, FIG. 1, page 3, lines 27-37).

2. The central server of claim 1 wherein the control system is further adapted to determine whether the primary user device is online and identify the primary user device as the user device for serving the request if the primary user device is online (Appendix B, page 5, lines 13-14).

3. The central server of claim 2 wherein the control system is further adapted to identify one of the at least one secondary user devices as the user device for serving the request if the primary user device is not online (Appendix B, page 3, lines 40-42).

4. The central server of claim 3 wherein if the primary user device is not online and the at least one secondary user device comprises a plurality of secondary user devices (Appendix B, Table A), the control system is further adapted to:
    identify ones of the plurality of secondary user devices hosting a desired version of the requested content (Appendix B, Table A, page 5, lines 17-32);
    if only one of the plurality of secondary user devices hosts the desired version of the requested content, identify the one of the plurality of secondary user devices as the user device for serving the request (Appendix B, page 3, lines 40-42); and
    if more than one of the plurality of secondary user devices host the desired version of the requested content, select the user device for serving the request from the more than one of the plurality of secondary user devices (Appendix B, Table A, page 5, lines 21-30).

5. The central server of claim 4 wherein the control system is further adapted to select the user device for serving the request from the more than one of the plurality of secondary user devices based upon at least one predetermined criterion for identifying an optimal user device (Appendix B, Table A, page 5, lines 21-32).

6. The central server of claim 2 wherein if the primary user device is not online, the control system is further adapted to determine whether the guest node is permitted to access the at least one secondary user device (Appendix B, page 6, lines 5-10).

7. The central server of claim 6 wherein the control system is further adapted to determine whether the guest node is permitted to access the at least one secondary user device based on at least one of a group consisting of: a list of guests permitted to access the at least one secondary user device, whether a guest associated with the guest node is an invited guest, and whether the guest associated with the guest node is a premium level user of the hybrid P2P content sharing system (Appendix B, page 6, lines 5-10).

8. The central server of claim 6 wherein if the guest node is permitted to access the at least one secondary user device, the control system is further adapted to identify one of the at least one secondary user devices as the user device for serving the request (Appendix B, page 6, lines 12-16).

9. The central server of claim 1 wherein the control system is further adapted to:
  determine whether there has been a primary sharing engine override (Appendix B, page 6, lines 21-23); and
  identify an optimal one of the primary user device and at least one secondary user device as the user device for serving the request if there has been a primary sharing engine override (Appendix B, page 6, lines 21-23).

10. A method for sharing content in a hybrid peer-to-peer (P2P) content sharing system including, for a particular user, a primary user device (Appendix B, FIG. 1, device A) comprising a primary sharing engine for sharing content stored on the primary user device and at least one secondary user device (Appendix B, FIG. 1, devices B, C, and D) comprising a secondary sharing engine for obtaining and sharing at least one version of the content shared by the primary user device (Appendix B, page 5, lines 2-5), comprising:
  receiving a request at a proxy from a guest node for content shared by the user (Appendix B, page 3, lines 1-13, page 5, lines 16-17, and FIG. 1);
  identifying one of the primary user device associated with the particular user and the at least one secondary user device associated with the particular user as a user device for serving the request (Appendix B, Table A, page 5, lines 13-30), wherein the at least one secondary user device is automatically configured based on known capabilities of the at least one secondary user device (Appendix B, page 4, lines 9-12); and
  routing the request to the user device for serving the request (Appendix B, FIG. 1, page 3, lines 27-37).

11. The method of claim 10 wherein identifying one of the primary user device and the at least one secondary user device as the user device for serving the request comprises:
  determining whether the primary user device is online (Appendix B, page 5, lines 13-14); and
  identifying the primary user device as the user device for serving the request if the primary user device is online (Appendix B, page 5, lines 13-14).

12. The method of claim 11 wherein identifying one of the primary user device and the at least one secondary user device as the user device for serving the request further comprises:
  identifying one of the at least one secondary user devices as the user device for serving the request if the primary user device is not online (Appendix B, page 3, lines 40-42).

13. A hybrid peer-to-peer (P2P) content sharing system comprising:
  a primary user device (Appendix B, device A) associated with a user and comprising a primary sharing engine adapted to share content stored by the primary user device (Appendix B, page 5 lines 2-5);
  at least one secondary user device associated with the user and comprising a secondary sharing engine adapted to obtain and share at least one version of the content shared by the primary user device (Appendix B, FIG. 1, devices B, C, D, page 5 lines 2-5), wherein the at least one secondary user device is automatically configured based on known capabilities of the at least one secondary user device (Appendix B, page 4, lines 9-12); and
  a central server communicatively coupled to the primary user device and the at least one secondary user device via a network and comprising a proxy adapted to (Appendix B, FIG. 1):
    receive a request for content shared by the user from a guest node (Appendix B, page 3, lines 10-13, page 5, lines 16-17, and FIG. 1);
    identify one of the primary user device and the at least one secondary user device as a user device for serving the request (Appendix B, Table A, page 5, lines 13-30); and
    route the request to the user device for serving the request (Appendix B, FIG. 1, page 3, lines 27-37).

14. The system of claim 13 wherein the proxy is further adapted to determine whether the primary user device is online and identify the primary user device as the user device for serving the request if the primary user device is online (Appendix B, page 5, lines 13-14).

15. The system of claim 14 wherein the proxy is further adapted to identify one of the at least one secondary user devices as the user device for serving the request if the primary user device is not online (Appendix B, page 3, lines 40-42).

16. The system of claim 13 wherein the shared content comprises a plurality of media files and the requested content comprises one of the plurality of media files (Appendix B, page 3, lines 24-25).

17. The system of claim 16 wherein the primary user device is notified of a configuration of the secondary user device and is further adapted to provide at least a highest quality one of the at least one version of each of the plurality of media files to the secondary user device (Appendix B, page 5, lines 2-11).

\* \* \* \* \*

UNITED STATES PATENT AND TRADEMARK OFFICE
CERTIFICATE OF CORRECTION

| | |
|---|---|
| PATENT NO. | : 8,041,784 B1 |
| APPLICATION NO. | : 11/475635 |
| DATED | : October 18, 2011 |
| INVENTOR(S) | : Christopher M. Amidon et al. |

It is certified that error appears in the above-identified patent and that said Letters Patent is hereby corrected as shown below:

In column 9, at line 61, delete "(Appendix B, FIG. 1)".
In column 9, at lines 63-64, delete "(Appendix B, FIG. 1, device A)".
In column 9, at lines 66-67, delete "(Appendix B, FIG. 1, devices B, C, and D)".
In column 10, at line 2, delete "(Appendix B, page 5, lines 2-5)".
In column 10, at line 5, delete "(Appendix B, FIG. 1)".
In column 10, at lines 6-7, delete "(Appendix B, FIG. 1, page 6, lines 12-16)".
In column 10, at lines 10-11, delete "(Appendix B, page 3, lines 1-13, page 5, lines 16-17, and FIG. 1)".
In column 10, at lines 15-16, delete "(Appendix B, Table A, page 5, lines 13-30)".
In column 10, at line 19, delete "(Appendix B, page 4 lines 9-12)".
In column 10, at lines 22-23, delete "(Appendix B, FIG. 1, page 3, lines 27-37)".
In column 10, at line 28, delete "(Appendix B, page 5, lines 13-14)".
In column 10, at lines 32-33, delete "(Appendix B, page 3, lines 40-42)".
In column 10, at lines 36-37, delete "(Appendix B, Table A)".
In column 10, at lines 39-40, delete "(Appendix B, Table A, page 5, lines 17-32)".
In column 10, at lines 44-45, delete "(Appendix B, page 3, lines 40-42)".
In column 10, at lines 49-50, delete "(Appendix B, Table A, page 5, lines 21-30)".
In column 10, at lines 55-56, delete "(Appendix B, Table A, page 5, lines 21-32)".
In column 10, at lines 60-61, delete "(Appendix B, page 6, lines 5-10)".
In column 11, at line 3, delete "(Appendix B, page 6, lines 5-10)".
In column 11, at line 8, delete "(Appendix B, page 6, lines 12-16)".
In column 11, at line 12, delete "(Appendix B, page 6, lines 21-23)".
In column 11, at line 16, delete "(Appendix B, page 6, lines 21-23)".
In column 11, at line 19, delete "(Appendix B, Figure 1, device A)".
In column 11, at line 22, delete "(Appendix B, Figure 1, devices B, C, and D)".
In column 11, at line 26, delete "(Appendix B, page 5, lines 2-5)".
In column 11, at lines 27-28, delete "(Appendix B, page 3, lines 1-13, page 5, lines 16-17, and Figure 1)".
In column 11, at lines 32-33, delete "(Appendix B, Table A, page 5, lines 13-30)".

Signed and Sealed this
Twenty-fifth Day of September, 2012

David J. Kappos
*Director of the United States Patent and Trademark Office*

CERTIFICATE OF CORRECTION (continued)
U.S. Pat. No. 8,041,784 B1

In column 11, at line 36, delete "(Appendix B, page 4, lines 9-12)".
In column 11, at line 38, delete "(Appendix B, Figure 1, page 3, lines 27-37)".
In column 11, at line 43, delete "(Appendix B, page 5, lines 13-14)".
In column 11, at line 46, delete "(Appendix B, page 5, lines 13-14)".
In column 12, at line 3, delete "(Appendix B, page 3, lines 40-42)".
In column 12, at line 6, delete "(Appendix B, device A)".
In column 12, at line 9, delete "(Appendix B, page 5 lines 2-5)".
In column 12, at lines 13-14, delete "(Appendix B, Figure 1, devices B, C, D, page 5 lines 2-5)".
In column 12, at line 17, delete "(Appendix B, page 4, lines 9-12)".
In column 12, at lines 20-21, delete "(Appendix B, Figure 1)".
In column 12, at lines 23-24, delete "(Appendix B, page 3, lines 10-13, page 5, lines 16-17, and Figure 1)".
In column 12, at lines 27-28, delete "(Appendix B, Table A, page 5, lines 13-30)".
In column 12, at line 30, delete "(Appendix B, Figure 1, page 3, lines 27-37)".
In column 12, at line 35, delete "(Appendix B, page 5, lines 13-14)".
In column 12, at lines 39-40, delete "(Appendix B, page 3, lines 40-42)".
In column 12, at lines 43-44, delete "(Appendix B, page 3, lines 24-25)".
In column 12, at line 49, delete "(Appendix B, page 5, lines 2-11)".